United States Patent
Kim et al.

(10) Patent No.: US 10,544,542 B2
(45) Date of Patent: Jan. 28, 2020

(54) CONTROL METHOD FOR LAUNDRY TREATING APPARATUS

(71) Applicant: LG Electronics, Inc., Seoul (KR)

(72) Inventors: Hyeonjoong Kim, Seoul (KR); Injae Han, Seoul (KR)

(73) Assignee: LG ELECTRONICS INC., Seoul (KR)

(*) Notice: Subject to any disclaimer, the term of this patent is extended or adjusted under 35 U.S.C. 154(b) by 121 days.

(21) Appl. No.: 15/926,005

(22) Filed: Mar. 20, 2018

(65) Prior Publication Data

US 2018/0266043 A1 Sep. 20, 2018

(30) Foreign Application Priority Data

Mar. 20, 2017 (KR) .......................... 10-2017-0034393

(51) Int. Cl.
*D06F 58/28* (2006.01)
*D06F 58/20* (2006.01)
*D06F 58/02* (2006.01)

(52) U.S. Cl.
CPC ............ *D06F 58/28* (2013.01); *D06F 58/206* (2013.01); *D06F 58/02* (2013.01); *D06F 2058/287* (2013.01)

(58) Field of Classification Search
CPC .. D06F 58/28; D06F 58/206; D06F 2058/287; F25B 30/02; F28D 2021/0071
See application file for complete search history.

(56) References Cited

U.S. PATENT DOCUMENTS

| 6,370,896 B1* | 4/2002 | Sakakibara | F25B 9/008 62/201 |
|---|---|---|---|
| 6,430,949 B2* | 8/2002 | Noro | F24H 4/04 62/183 |
| 2004/0068999 A1* | 4/2004 | Jessen | F25B 49/02 62/222 |
| 2012/0079735 A1 | 4/2012 | Lee et al. | |
| 2014/0041249 A1* | 2/2014 | Jung | D06F 58/206 34/282 |
| 2016/0327322 A1* | 11/2016 | Izadi-Zamanabadi | F25B 49/02 |
| 2017/0328617 A1* | 11/2017 | Izadi-Zamanabadi | F25B 49/02 |

FOREIGN PATENT DOCUMENTS

| JP | 2005069539 | 3/2005 |
|---|---|---|
| JP | 2007075189 | 3/2007 |
| WO | WO2005075728 | 8/2005 |

OTHER PUBLICATIONS

European Extended Search Report in European Application No. 18162014.7, dated May 22, 2018, 10 pages.

* cited by examiner

*Primary Examiner* — David J Laux
(74) *Attorney, Agent, or Firm* — Fish & Richardson P.C.

(57) ABSTRACT

Disclosed is a control method for laundry treating apparatus configured to perform a dry cycle for clothes by operating a heat pump comprising: a measuring step for measuring a temperature of a refrigerant and a temperature of air which pass through an evaporator to exchange heat; a comparing step for comparing a difference between the measured temperatures of the refrigerant and air with a preset reference temperature; and an adjusting step for adjusting an opening degree of the expansion valve according to the result of the comparing step.

12 Claims, 4 Drawing Sheets

CONTROL METHOD FOR LAUNDRY TREATING APPARATUS

CROSS-REFERENCE TO RELATED APPLICATIONS

This application claims priority to Korean Patent Application No. 10-2017-0034393 filed on Mar. 20, 2017, in Korea, the entire contents of which is hereby incorporated by reference in its entirety.

FIELD

Embodiments of the present disclosure relate to a control method for a laundry treating apparatus, more particularly, to a control method for a laundry treating apparatus including a heat pump.

BACKGROUND

Generally, a laundry treating device means an electric appliance which is able to perform washing, drying or both of the washing and drying for clothes, shoes and the like. Such a laundry treating apparatus may perform only one of washing and drying functions or both of them.

The laundry treating apparatus for such the drying function may be classified into an exhaustion type and a condensation type. In the exhaustion type laundry treating apparatus, external air is drawn therein and heated by a heater to be supplied to an accommodation unit provided to accommodate drying objects. Hence, the heated air having used in drying the drying objects is exhausted outside again. In the condensation type laundry treating apparatus, the heated air is supplied to the accommodation unit and the air containing moisture or water elements has the moisture removed therefrom while passing through an evaporator. Hence, the air is heated while passing through a condenser and then re-supplied to the accommodating unit, only to form a circulation path for circulating air.

In this instance, the condensation type laundry treating apparatus has the evaporator and the condenser which are installed on the circulation path together so that the temperature and pressure of a refrigerant may rise consistently while the drying is performed.

As the high-temperature air passes through the condenser, the refrigerant which fails to be cooled sufficiently is drawn into the evaporator and the refrigerant absorbs heat in the evaporator again. Accordingly, the temperature of the refrigerant ends up with rising consistently as a dry cycle is progressed.

When the temperature of the refrigerant consistently rises as the drying for clothes is progressed, a difference between the temperature of the refrigerant and the temperature of the air passing through the evaporator might decrease and efficiency of heat exchange might deteriorate disadvantageously.

SUMMARY

Accordingly, an object of the present disclosure is to address the above-noted and other problems and to provide a control method for a laundry treating apparatus which may enhance the efficiency of the heat exchange performed in a heat pump by changing a super heat degree through control of an electronic expansion valve.

A further object of the present disclosure is to provide a control method for a laundry treating apparatus which may reduce the time and energy consumed in drying by enhancing the efficiency of the heat exchange.

Embodiments of the present disclosure may provide a control method for laundry treating apparatus configured to perform a dry cycle for clothes by operating a heat pump comprising an expansion valve, the control method comprising: a measuring step for measuring the temperatures of a refrigerant and air which pass through an evaporator to exchange heat; a comparing step for comparing a difference between the measured temperatures of the refrigerant and air with a preset reference temperature; and an adjusting step for adjusting an opening degree of the expansion valve according to the result of the comparing step.

The measuring step may measure the temperatures of the refrigerant and air before the heat exchange with each other.

The measuring step may measure the temperature of the refrigerant passing through the evaporator, adjacent to an inlet of the refrigerant pipe, and the temperature of the air flowing in an upper portion of a duct where the evaporator is provided.

The adjusting step may decrease the opening degree of the expansion valve, when the comparing step determines that the difference between the measured temperatures of the refrigerant and air is less than the reference temperature.

The control method for the laundry treating apparatus may further comprise an additional adjusting step for additionally adjusting the opening degree of the expansion valve as the time taken to perform the dry cycle passes, the additional adjusting step which is performed after the adjusting step.

The additional adjusting step may adjust the opening degree of the expansion valve at least one time.

The additional adjusting step may adjust the opening degree of the expansion valve, whenever an every preset time interval passes.

The additional adjusting step may sequentially decrease the opening degree of the expansion valve.

Embodiments of the present disclosure may also provide a control method for a laundry treating apparatus comprising an accommodating unit provided to accommodate clothes; a duct provided outside the accommodating unit and configured to form a circulation path of air inside the accommodating unit; a fan provided in the duct; a refrigerant pipe provided to form a circulation path of a refrigerant; an evaporator fixed to the refrigerant pipe in the duct and configured to vaporize the refrigerant by exchanging heat with the air; a condenser fixed to the refrigerant pipe in the duct and configured to condense the refrigerant by exchanging heat with the air having passed the evaporator; a compressor fixed in the refrigerant pipe and configured to compress the refrigerant having passed the evaporator; and an expansion valve configured to control the opening and closing of the refrigerant pipe provided between the condenser and the evaporator, the control method comprising: a measuring step for measuring a first temperature which is the temperature of the air flowing in an upper portion of the duct where the evaporator is provided a second temperature which is the temperature of the refrigerant passing through the evaporator, adjacent to an inlet of the refrigerant pipe; a comparing step for comparing a difference between the first temperature and the second temperature with a preset reference temperature; and an adjusting step for adjusting an opening degree of the expansion valve according to the result of the comparing step.

The adjusting step may increase an overheat degree of the expansion valve by decreasing the opening degree of the expansion valve, when the comparing step determines that the difference between the first temperature and the second temperature is less than the reference temperature.

The control method for the laundry treating apparatus may further comprise an additional adjusting step for additionally adjusting the opening degree of the expansion valve at least one time as the time taken to perform the dry cycle passes, the additional adjusting step which is performed after the adjusting step.

The additional adjusting step may sequentially decrease the opening degree of the expansion valve to increase the overheat degree, whenever an every preset time interval passes.

Advantages of the mobile terminal in accordance with the embodiments of the present disclosure will be described. The control method for the laundry treating apparatus is capable of enhancing the efficiency of the heat exchange performed in the heat pump by changing the super heat degree through the control of the electronic expansion valve.

Furthermore, the control method for the laundry treating apparatus may reduce the time and energy consumed in drying by enhancing the efficiency of the heat exchange.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

The terminology used in the present disclosure is used only to describe specific embodiments, not intended to limit the present disclosure. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized. In general, a suffix such as "module" and "unit" may be used to refer to elements or components. Use of such a suffix herein is merely intended to facilitate description of the specification, and the suffix itself is not intended to give any special meaning or function.

Figure 1:
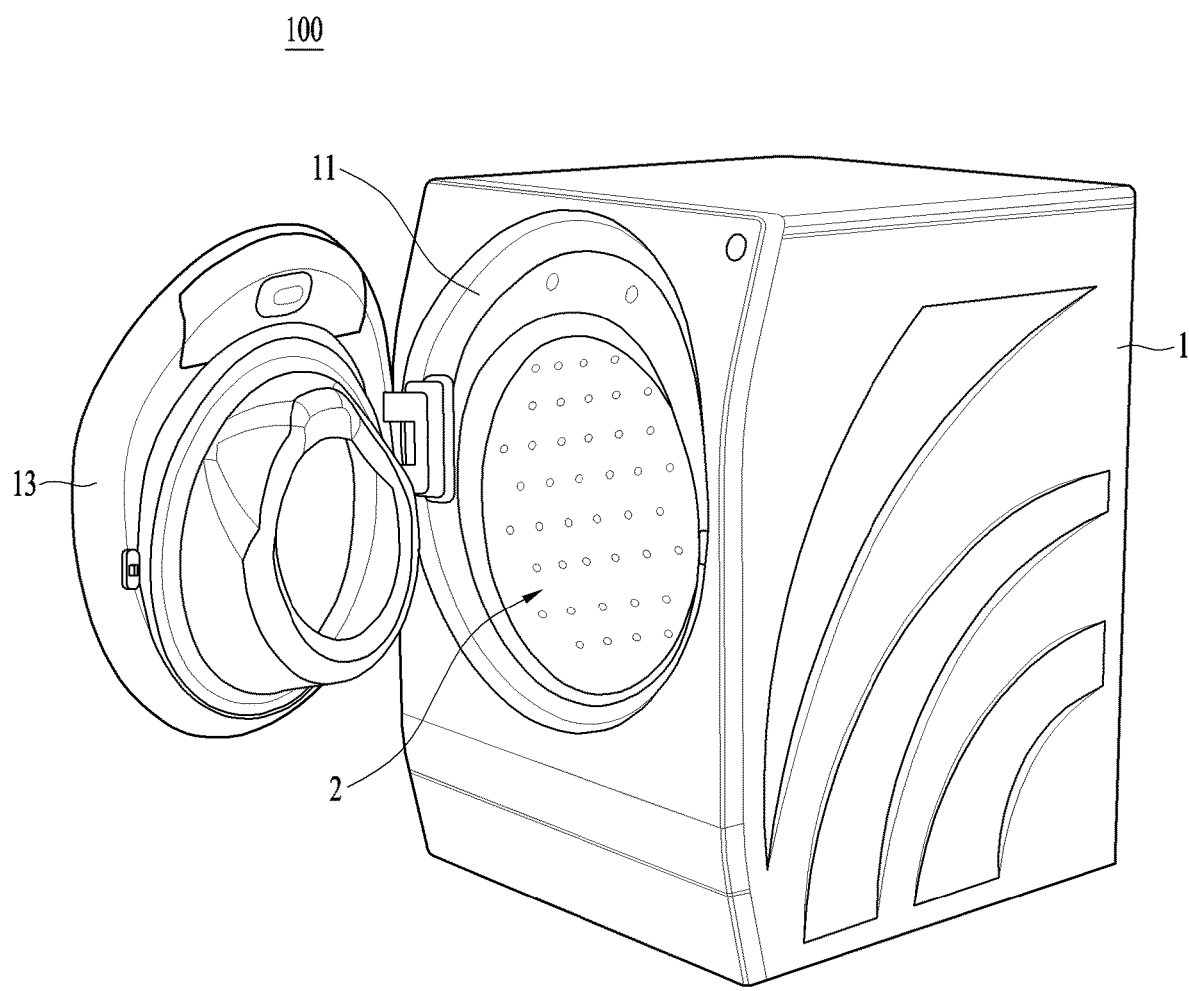
FIG. 1 is a perspective diagram of a laundry treating apparatus in accordance with one embodiment of the present disclosure.

FIG. 1 is a perspective diagram of a laundry treating apparatus in accordance with one embodiment of the present disclosure.

Referring to FIG. 1, the laundry treating apparatus 100 in accordance with one embodiment may include a cabinet 1 and a door 13. The cabinet 1 is provided in an accommodating unit 2 which is the space for accommodating clothes. A laundry introduction opening 11 is provided in a front surface of the cabinet 1 to load or unload clothes into or from the accommodating unit 2 out of the cabinet 1. The door 13 is rotatably coupled to the cabinet 1 to open and close the laundry introduction opening.

Figure 2:
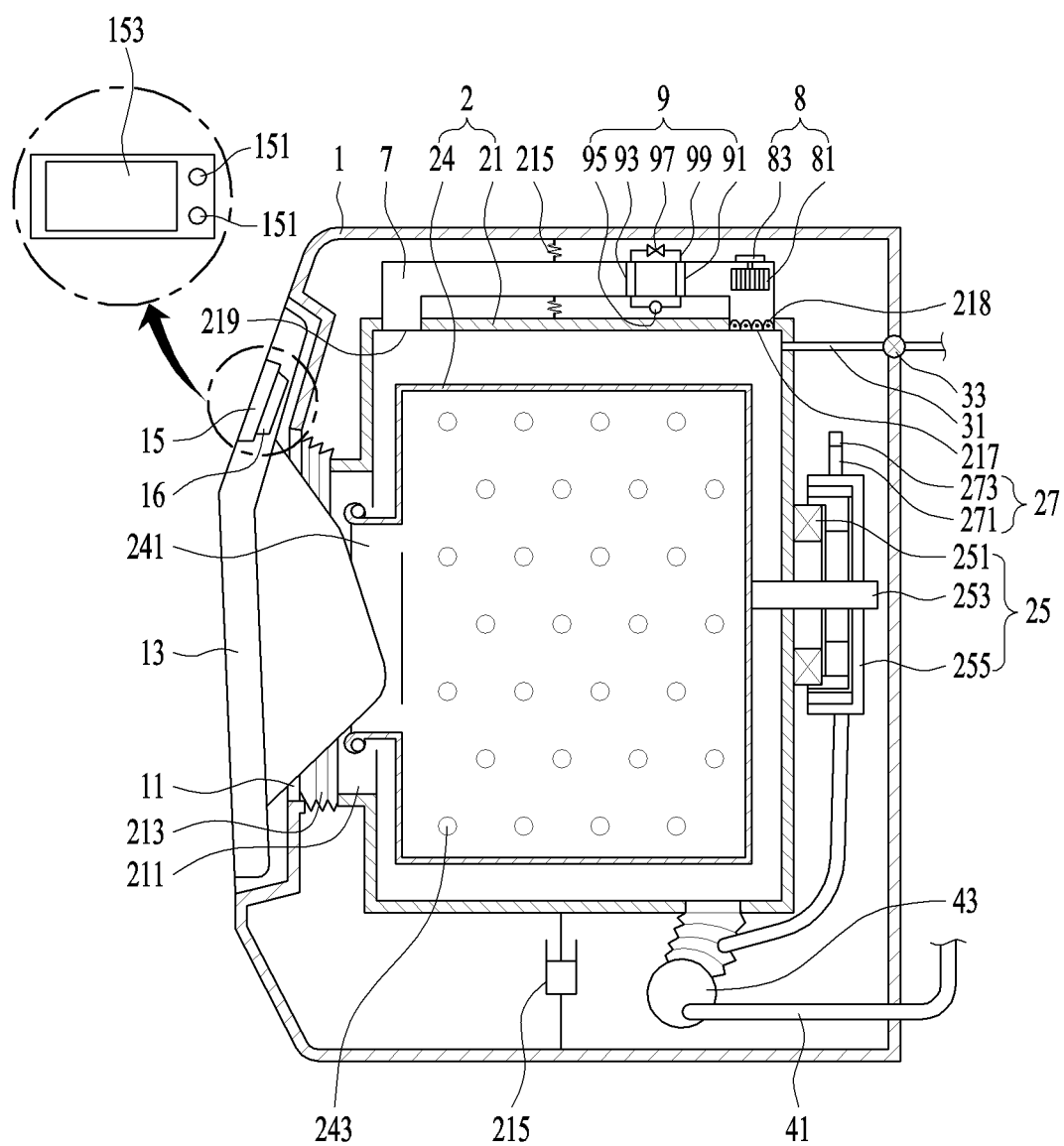
FIG. 2 is a side sectional diagram to schematically describe the laundry treating apparatus shown in FIG. 1.

Referring to FIG. 2, the laundry treating apparatus 100 in accordance with the embodiment will be described in detail. FIG. 2 is a side sectional diagram to schematically describe the laundry treating apparatus shown in FIG. 1.

As shown in FIG. 2, the door 13 includes a control panel 15 configured to receive a user's input of a control command and display a process of washing or drying progress according to the input control command.

The control panel 15 includes an input unit 151 configured to receive a user's input of a control command; a display unit 153 configured to display one or more control commands which are selectable by the user or information about a process of progress for the control command selected by the user; and a controller 16 configured to control the laundry treating apparatus 100 including the display unit 153 according to the control command signal transmitted from the input unit 151. The arrangement of the input unit 151, the display unit 153 and the controller 16 which is shown in FIG. 2 is one of examples and the embodiments of the present disclosure are not limited thereto.

Meanwhile, the laundry treating apparatus 100 in accordance with the embodiment may be an electric appliance which is capable of performing a drying function as well as a washing function for clothes.

In the former case, the accommodating unit 2 may include only a drum 24 which is rotatable within the cabinet 1 and provides a predetermined space for storing clothes. In the latter case, the accommodating unit 2 may include a tub 21 which is provided in the cabinet and provides a predetermined space for storing water; and a drum 24 rotatably mounted in the tub 21 and configured to provide a predetermined space for storing clothes.

Hereinafter, description will be made based on the structure of the accommodating space configured of the tub 21 and the drum 24.

The tub 21 is fixedly mounted in the cabinet 1 by using a supporting unit. Such a supporting unit may be provided as a spring 215 and a damper 216 which are configured to prevent the transmission of the vibration generated in the tub 21 to the cabinet 1.

A tub opening 211 is provided in the tub 21, in communication with the laundry introduction opening 11. The tub opening 211 is connected to the laundry introduction opening via a gasket 213. The gasket 213 is employed to prevent the water stored in the tub 21 from leaking into the cabinet 1.

The tub 21 is supplied water via a water supply pipe 31 and the water supplied to the tub 21 may be exhausted outside the cabinet 1 via a drainage pipe 41.

The water supply pipe 31 is provided to connect a water supply source (not shown) located outside the cabinet 1 to the tub 21. Also, the water supply pipe 31 is open or closable by a first valve 33 controlled by the controller 16.

The drainage pipe 41 is employed to guide the tub stored in the tub 21 toward the outside of the cabinet 1 and comprises a pump 43.

A water level inside the tub 21 may be controlled by using a pressure sensing unit 27. The pressure sensing unit 27 may include a communication pipe 271 in communication with the internal space of the tub 21; and a pressure sensor 273 configured to sensing an internal pressure of the communication pipe 271.

In the pressure sensing unit 27 shown in FIG. 2, the communication pipe 271 may be in communication with the internal space of the tub 21 via the drainage pipe 41. In this instance, when the water level inside the tub 21 rises, the internal pressure of the communication pipe 271 may rise and the pressure sensor 273 senses such a rising pressure only to transmit a corresponding data signal (a voltage or current) to the controller 16. The controller 16 may determine the water level inside the tub 21 based on the data transmitted from the pressure sensor 273.

The drum 24 may include a drum opening 241 in communication with the laundry introduction opening 11 and the tub opening 211; and a plurality of through-holes 243 for communicating the internal space of the drum 24 with the internal space of the tub 21.

The drum 24 is rotatable by a drive unit 25 provided in the cabinet 1. The drive unit 25 may include a stator 251 fixed to a rear surface of the tub 21 and configured to form a rotating filed when electric currents are supplied thereto; a rotor 255 which is rotatable by the rotating field; and a shaft 253 penetrating the tub 21 to connect the drum 24 and the rotor 255 with each other.

A hot air supply unit (7, 8 and 9) may include a duct 7 provided in an upper portion of the tub 21 to form an air circulation path; a fan 8 provided in the duct 7 to blow air inside the tub 21; and a heat pump (HP) 9 configured to dehumidify and heat the air sucked into the duct 7.

The duct 7 having one end connected with an outlet hole 218 penetrating the tub 21 and the other end connected with an inlet hole 219 penetrating the tub 21. Such the duct 7 may have an extended portion extended between the both ends approximately in parallel.

The outlet hole 218 is provided in an upper portion of the tub 21, while penetrating a cylinder-shaped circumferential surface of the tub 21.

Meanwhile, a filter 217 configured to filter the air sucked into the duct 7 may be provided in the outlet hole 218. The filter 217 has the same radius of curvature with a radius of curvature of the tub 21 so that a surface of the filter can define an inner circumferential surface of the tub 21.

Figure 3:
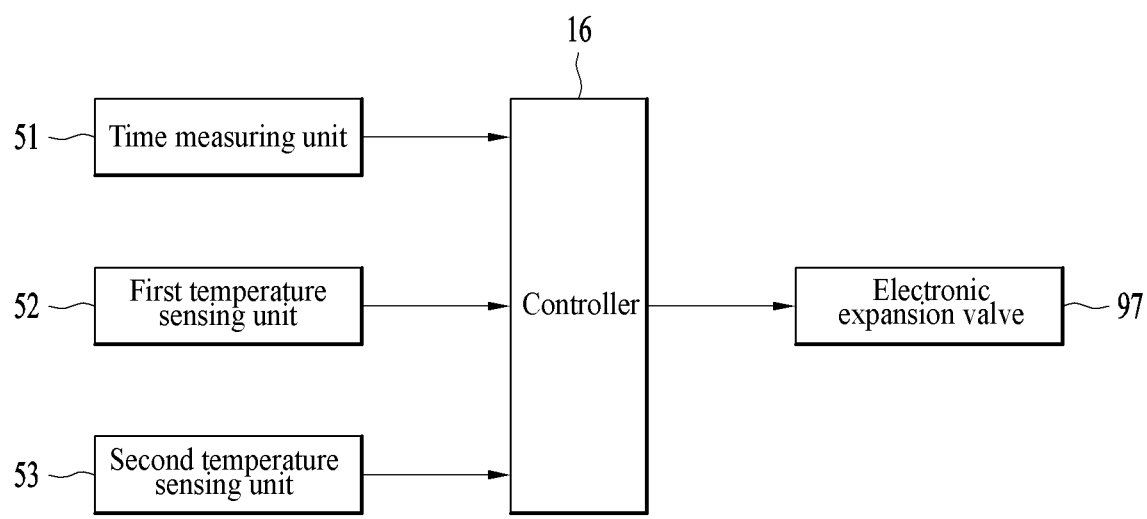
FIG. 3 is a block diagram illustrating a structure for performing a control method for the laundry treating apparatus in accordance with one embodiment of the present disclosure.

Referring to FIG. 3, it is shown that the filter 217 is provided in the outlet hole 218 and that is one of examples. Alternatively, the filter 217 may be inserted along the duct 7 from the outlet hole 218 or projected downwardly from the outlet hole 218 into the tub 21.

Meanwhile, a spraying unit (not shown) may be further provided in the outlet hole 218 to wash the filter 217. The spraying unit may be configured to remove lint or foreign substances which accumulate on the filter by spraying the water supplied from the external water supply source (not shown) to a lower portion from an upper portion of the filter 217 via a nozzle fixed in the duct 7.

The fan 8 may include an impeller 81 rotatably provided in the duct 7; and a fan motor 83 fixed to the outside of the duct 7 and configured to rotate the impeller 81.

The heat pump 9 provided as an heat exchanger may include an evaporator 91 provided in the duct 7 and configured to vaporize the refrigerant; a condenser 93 provided in the duct 7 and configured to condense the refrigerant; a compressor 95 configured to move the refrigerant to the condenser 93 after compressing the refrigerant having passed the evaporator 91; an expansion valve 97 configured to lower a pressure by expanding the refrigerant; and a refrigerant pipe 99 configured to communicate the evaporator 91, the condenser 93, the compressor 95 and the expansion valve 97 with each other.

The evaporator 91 is configured to vaporize the refrigerant into a gaseous refrigerant while absorbing a latent heat and chill the sucked air by using the heat emitted from the refrigerant which is being vaporized. Accordingly, the vapor contained in the air is condensed into water which is a liquid. The refrigerant pipe 99 penetrates such the evaporator 91 so that the refrigerant may be drawn into an inlet of the evaporator 91 and exhausted via an outlet of the evaporator 91. The heat exchange between the refrigerant and the air occurs in the other area of the refrigerant pipe provided in the evaporator 91 and hardly occurs in the area of the refrigerant pipe 99 located in the inlet and outlet of the evaporator 91.

The compressor 95 is configured to compress the evaporated gaseous refrigerant into a high-temperature and high-pressure refrigerant. The condenser 93 is configured to condense the compressed high-temperature and high-pressure refrigerant into a low-temperature liquid refrigerant. At this time, the refrigerant emits the latent heat and the latent heat heats the air passing through the condenser 93. The expansion valve 97 is configured to expand the volume of the low-temperature liquid refrigerant and lower the pressure and temperature more. The refrigerant having the lowered pressure and temperature may re-pass through the evaporator 91.

Meanwhile, the compressor 95 may be provided in any types, only if capable of realizing the functions mentioned above. Examples of the compressor 95 may include a reciprocating pressure 95, a rotary compressor 95 and a scroll compressor 95.

The expansion valve 97 is configured to adjust the flow amount of the refrigerant by adjusting an opening degree, so as to vary the inflow amount of the refrigerant to the evaporator 91 positively. Accordingly, the expansion valve 97 may adjust the flow amount of the refrigerant supplied to the evaporator 91 as well as expand the high-temperature and high-pressure liquid refrigerant exhausted from the condenser 93.

A linear expansion valve (LEV) configured to continuously adjust the flow amount of the refrigerant according to load variation of an indoor unit may be provided as such the expansion valve 97.

Meanwhile, the expansion valve 97 may perform a function for adjusting an overheat degree by adjusting of an opening degree. In other words, when the opening degree of the expansion valve is reduced, a pressure difference of the refrigerant passing through the expansion valve 97 may be increased and the temperature of the refrigerant may be lowered more than before the opening degree of the expansion valve 97 is decreased so that the degree of the overheat may be increased. In contrast, when the opening degree of the expansion valve 97 is increased, the reverse action occurs so that the degree of the overheat may be decreased.

Accordingly, as the drying function for the clothes progresses, the temperature of the refrigerant may rises consistently and a difference between the temperature of the refrigerant and the temperature of the air passing through the evaporator 91 may be reduced. The disadvantage of the deteriorated heat exchange efficiency may be overcome by increasing the overheat degree, in other words, decreasing the opening degree of the expansion valve 97.

Hereinafter, a related structure with a control method for the laundry treating apparatus 100 in accordance with one embodiment will be described in detail, referring to FIG. 3. FIG. 3 is a block diagram illustrating a structure for performing a control method for the laundry treating apparatus 100 in accordance with one embodiment of the present disclosure.

Referring to FIG. 3, the controller 16 may receive a signal from a time measuring unit 51, a first temperature sensing unit 52 and a second temperature sensing unit 53 and control the opening degree of the expansion valve 97 to be decreased according to the signal.

Once the drying function, in other words, the dry cycle starts, the time measuring unit 51 continuously measures the time taken to perform the dry cycle from a start point of the time and transmits the measured valves to the controller 16.

The first temperature sensing unit 52 may measure the temperature of the refrigerant drawn into the evaporator for the heat exchange with air. Specifically, the first temperature sensing unit may be configured to measure the temperature of the refrigerant right before the heat exchange with the air and transmit the measured temperature value to the controller 16. Accordingly, the first temperature sensing unit 52 may be provided in an outer surface of the refrigerant pipe, arranged adjacent to the entrance of the evaporator 91. The first temperature sensing unit 52 may measure the temperature of the area of the refrigerant pipe adjacent to the entrance of the evaporator 91 so as to measure the temperature of the refrigerant right before the heat exchange with the air.

The second temperature sensing unit 53 may be configured to measure the temperature of the air flowing along the duct 7 so as to exchange heat with the refrigerant, more specifically, measure the temperature of the air right before the heat exchange with the refrigerant and transmit the measured value to the controller 16. Accordingly, the second temperature sensing unit 53 may be provided in the duct 7 to measure the temperature of the air passing through the duct 7 over an upper air flow of the evaporator 91, spaced a preset distance apart from the upper air flow along the duct 7 from the evaporator 91.

The expansion valve 97 may be configured to receive a control command from the controller 16 and adjust the flow amount of the refrigerant continuously. Accordingly, a linear expansion valve (LEV) may be used as one example of the expansion valve 97 to perform such the function. When receiving the control command from the controller 16, the expansion valve 97 may perform the function for adjusting the degree of the overheat by adjusting the opening degree.

Figure 4:
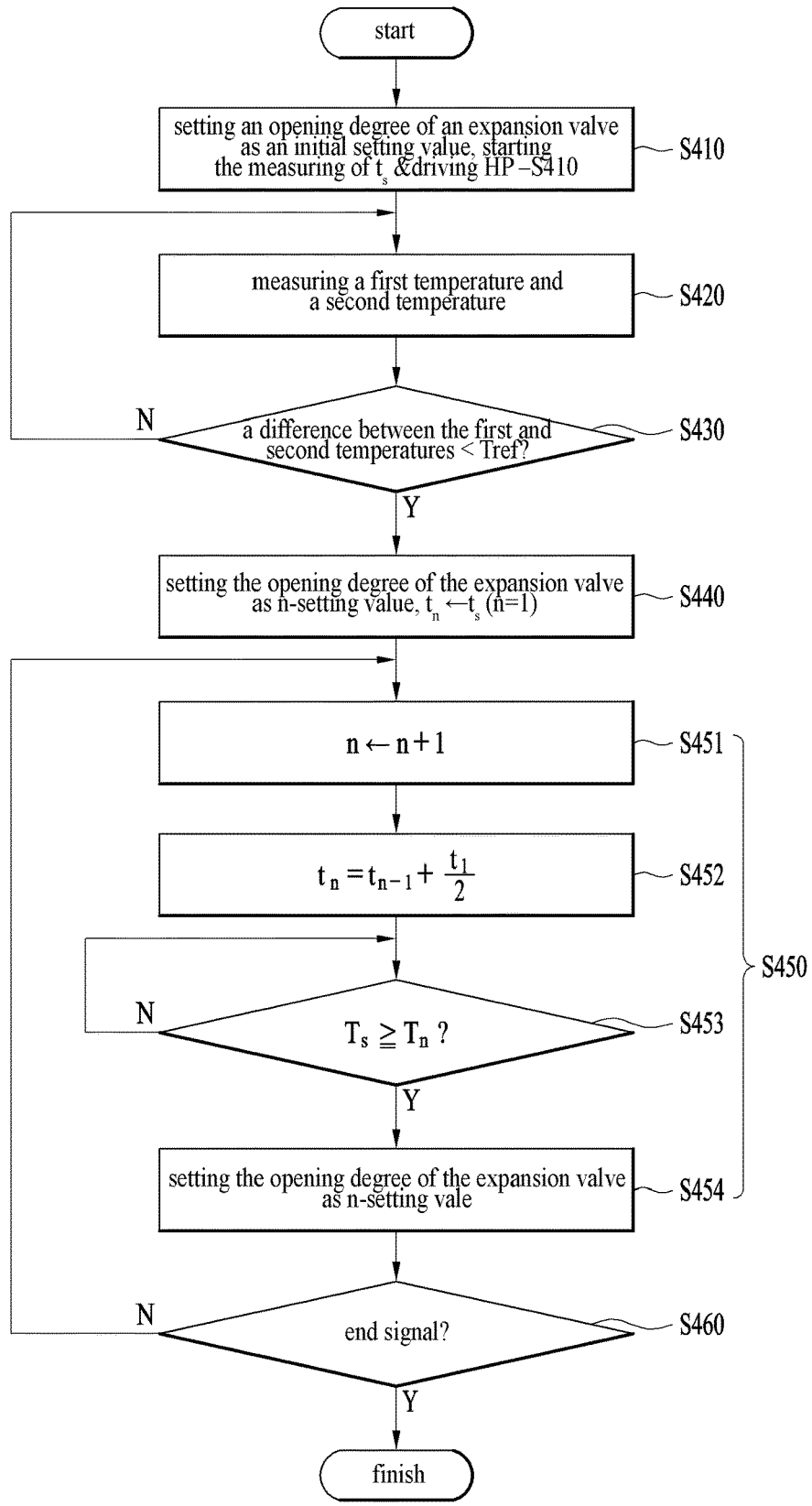
FIG. 4 is a flow chart illustrating the control method for the laundry treating apparatus in accordance with one embodiment of the present disclosure.

Hereinafter, the control method for the laundry treating apparatus in accordance with the embodiment of the present disclosure will be described in detail, referring to FIG. 4. FIG. 4 is a flow chart illustrating the control method for the laundry treating apparatus 100 in accordance with one embodiment of the present disclosure.

First of all, once the dry cycle starts, the laundry treating apparatus 100 will be operated as follows.

More specifically, once the dry cycle starts, the hot air supply unit 7, 8 and 9 is put into operation and the drum 24 is rotated. The time measuring unit 51 measures the time which will be taken from the start time point of the dry cycle. The internal air of the drum 24 is humid because of the clothes loaded in the drum 24.

Such the humid air is drawn into the duct 7 and circulated along the duct 7, after flowing through the outlet hole 218 and the filter 217 by the fan 8. At this time, the spraying unit provided in the outlet hole 218 sprays water toward the filter 217 downwardly so as to remove the foreign substances including lint which accumulate on the filter 217.

The air drawn into the duct 7 becomes chilled and dehumidified while passing through the evaporator 91 and then changed into high-temperature and high-pressured air while passing through the condenser 93, only to be re-supplied to the tub 21 via the inlet hole 219.

The high-temperature dry air drawn into the tub 21 may heat and dry the humid clothes, to be re-drawn into the duct 7. Accordingly, the air flow inside the accommodating unit 2 may form the circulation path configured of the drum 24 and the tub 21 via the duct 7.

Meanwhile, the high-temperature and high-pressure refrigerant exhausted from the compressor 95 may emit heat to the air, while passing through the condenser 93, only to be condensed into the low-temperature chilled and condensed liquid. While passing through the evaporator 91, the refrigerant having passed the expansion valve 97 is absorbing the latent heat from the air and converted into the gaseous refrigerant.

The temperature of the air forming such the circulation path gradually rises as the clothes are dried. In other words, the temperature of the air passing through the condenser 93 is gradually higher so that the refrigerant inside the condenser 93 might be drawn into the evaporator 91, in a state where it is not chilled enough. Then, the refrigerant absorbs heat again in the evaporator 91 and the temperature of the refrigerant cannot help rising consistently.

In this instance, there occurs a section where the temperature difference between the air passing the evaporator 91 and the refrigerant is decreased so that the heat exchange efficiency might deteriorate.

Accordingly, referring to FIG. 4, the control method for the laundry treating apparatus 100 in accordance with the embodiment will be described in detail. FIG. 4 is a flow chart illustrating the control method for the laundry treating apparatus 100 in accordance with one embodiment of the present disclosure.

Referring to FIG. 4, the control method for the laundry treating apparatus 100 in accordance with the embodiment of the present disclosure may include a measuring step (S420) for measuring the temperature of the air and the refrigerant passing through the evaporator 91; a comparing step (S430) for comparing the measured temperature difference between the refrigerant and the air with a preset reference temperature (Tref); an adjusting step (S440) for adjusting the opening degree of the expansion valve 97 based on the result of the comparing step (S430); and an additional adjusting step (S450) for additionally adjusting the opening degree of the expansion valve 97 as the time of the drying cycle passes, the additional adjusting step (S450) performed after the adjusting step (S440).

Once the dry cycle starts, the expansion valve 97 is set as an initial set value and the heat pump 9 is driven (S410). At this time, the time measuring unit 51 may measure the time ($t_s$) taken to perform the dry cycle from a start time point of the dry cycle and transmit the measured time to the controller 16. Hence, the controller 16 may store the time ($t_s$) transmitted from the time measuring unit 51 and start the measuring step (S420).

The measuring step (S420) may control the first temperature sensing unit 52 to measure the temperature of the refrigerant passing through the area of the refrigerant pipe which is adjacent to the entrance of the evaporator 91 and the second temperature sensing unit 53 to measure a first temperature of the air flowing along the duct 7 over the flow of the evaporator 91. Accordingly, the temperatures of the air just before the heat exchange in the evaporator 91 and the refrigerant may be measured.

In the comparing step (S430), the controller 16 may compare the first temperature transmitted from the first temperature sensing unit 5 and the second temperature transmitted from the second temperature sensing unit 53 with the preset reference temperature (Tref). The preset reference temperature (Tref) may be a preset value which is corresponding to a preset initial overheat degree and set as approximately 4° C.

When the difference between the first temperature and the second temperature is the preset reference temperature (Tref) or more in the comparing step (S430) (S430-N), the steps from the measuring step (S420) are continuously re-performed.

When the difference between the first temperature and the second temperature is less than the preset reference temperature (Tref) in the comparing step (S430) (S430-Y), the adjusting step (S440) for setting the opening degree of the expansion valve 97 is performed.

The adjusting step (S440) is provided as the step for adjusting the opening degree of the expansion valve 97 based on the result of the comparing step (S430). According to the embodiment, when the difference between the first temperature and the second temperature is less than the preset reference temperature (Tref), the opening degree of the expansion valve 97 may be decreased. For example, the opening degree of the expansion valve 97 may be set as a first setting value (n=1). In this instance, the first setting value is corresponding to a preset first overheat degree and the first overheat degree may be set as approximately 7° C.

In the adjusting step (S440), the controller receives the measured times ($t_s$) from the start time point of the dry cycle until the time measuring unit 51 sets the opening degree of the expansion valve 97 as the first setting value and stored the times ($t_s$) as $t_1$ (the value of 'n' is set as '1' after the value of '$t_s$' is stored in the value of '$t_n$').

When the opening degree of the expansion valve 97 is decreased, the difference between the high pressure and the lower pressure of the refrigerant passing through the expansion valve 97 is increased and then the temperature of the refrigerant becomes lowered more than before the opening degree of the expansion valve 97 is decreased. Accordingly, the difference between the temperatures of the refrigerant and air passing through the evaporator 91 becomes increased enough to improve the heat exchange efficiency.

Meanwhile, as the temperature of the air along the circulation path consistently rises, the opening degree of the expansion valve 97 in the adjusting step (S440) may be additionally adjusted preset numbers of times at preset time intervals not to deteriorate the improved heat exchange efficiency again.

In other words, when the opening degree of the expansion valve 97 is adjusted by the measuring and comparing of the temperatures, the opening degree of the expansion valve 97 is adjusted over time. It is general that the difference between the temperatures of the air and the refrigerant passing through the evaporator 91 becomes gradually smaller once the adjusting of the opening degree of the expansion valve 97 starts. Accordingly, it is more efficiency to consistently perform the adjusting of the opening degree of the expansion valve 97 as time passes.

The additional adjusting step (S450) may be performed after the adjusting step (S440) is performed.

The additional adjusting step (S450) is performed to adjust the opening degree of the expansion valve 97 at least one more time after the adjusting step (S440). Whenever a preset time passes, the additional adjusting step (S450) gradually decreases the opening degree of the expansion valve 97. The controller 16 determines whether to perform the additional adjusting step (S450) based on the time ($t_s$) transmitted from the time measuring unit 51.

For example, in the additional adjusting step (S450), the time ($t_1$) taken until the opening degree of the expansion valve 97 reaches the first setting valve is measured and the measured time is transmitted to the controller 16. At this time, when it continuously receives the times ($t_s$) measured from the start time point of the dry cycle, the controller 16 may sequentially decrease the opening degree of the expansion valve 97 at every time interval as a preset time period, which is corresponding to 50% of the time ($t_1$) taken for the opening degree of the expansion valve 97 to reach the first preset valve, passes.

Accordingly, in the additional adjusting step (S450), the valve of 'n' is increased as much as '1' (S451) and a corresponding value to 50% of $t_1$ is then added only to be stored in $t_2$ (S452). However, the corresponding value to 50% of $t_1$ is one of examples and adjusted as necessity occurs.

Hence, $t_{s2}$ is compared with the time ($t_s$) continuously measured from the start point of the dry cycle by the time measuring unit 51 (S453). When $t_2$ is less than the time continuously measured from the start time point of the dry cycle (S453-N), $t_2$ is continuously compared with the time continuously measured from the start time point of the dry cycle. When $t_2$ is the time continuously measured from the start time point of the dry cycle or more (S453-Y), the opening value of the expansion valve 97 is set as the second setting value (S454).

The second setting value is a preset value corresponding to $t_2$. In other words, the n-setting value corresponding to 'tn' is preset and stored. The second setting value may be set as a corresponding one of the overheat degrees preset as values which are sequentially increasing or decreasing.

After that, it is determined whether an end signal is received (S460). Unless the end signal is received, the additional adjusting step (S450) is performed again.

Once the additional adjusting step (S450) re-starts, 'n' is set as 3 (S451) and the processes are performed as mentioned above. Unless the end signal is received, 'n' increases by 1 every time when the processes are repeated (S451).

Such the repeated processes are performed according to the control method mentioned above and detailed description will be omitted accordingly.

Hence, the end signal is received and the dry cycle is ended.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A laundry treating apparatus, comprising:
   an accommodating unit configured to receive clothes;
   a duct located outside of the accommodating unit and configured to define a circulation path of air to the accommodating unit;
   a fan located in the duct and configured to blow air toward the accommodating unit;
   an evaporator located in the duct and configured to vaporize refrigerant based on heat exchange between refrigerant and air that pass the evaporator;
   a refrigerant pipe coupled to the evaporator and configured to define a circulation path of refrigerant;
   a condenser coupled to the refrigerant pipe in the duct and configured to condense refrigerant based on heat exchange between refrigerant and air that have passed the evaporator;
   a compressor coupled to the refrigerant pipe and configured to compress refrigerant that has passed the evaporator;
   an expansion valve located between the condenser and the evaporator and configured to control opening and closing of the refrigerant pipe;
   a first temperature sensor configured to measure a temperature of refrigerant;
   a second temperature sensor configured to measure a temperature of air a timer configured to measure an elapsed amount of time from a start of a dry cycle for drying clothes; and
   a controller configured to:
      obtain, from the first temperature sensor, a first temperature of refrigerant at a position adjacent to an inlet of the refrigerant pipe,
      obtain, from the second temperature sensor, a second temperature of air at an upper portion of the duct,
      determine a temperature difference between the first temperature and the second temperature,
      compare the temperature difference to a reference temperature,
      based on comparison results, adjust an opening degree of the expansion valve, wherein adjusting the opening degree of the expansion valve comprises decreasing the opening degree of the expansion valve based on a determination that the temperature difference between the first temperature and the second temperature is less than the reference temperature; and
      based on an elapsed amount of time from a start of the dry cycle being greater or equal to a present time, performing an additional adjustment of the opening degree of the expansion valve after adjusting the opening degree of the expansion valve.

2. The laundry treating apparatus of claim 1, wherein the controller is further configured to, based on a determination that the temperature difference between the first temperature and the second temperature is greater than or equal to the reference temperature, obtain subsequent temperatures from the first and second temperature sensors.

3. The laundry treating apparatus of claim 1, wherein the controller is further configured to adjust the opening degree of the expansion valve at a preset time interval to increase a heat degree of the expansion valve.

4. A control method for a laundry treating apparatus that is configured to perform a dry cycle for drying clothes based on operation of a heat pump comprising an expansion valve, the control method comprising:
   measuring a first temperature of refrigerant that passes an evaporator of the laundry treating apparatus, the evaporator being configured to exchange heat between refrigerant and air that pass the evaporator, wherein measuring the first temperature comprises measuring a temperature of refrigerant at a position adjacent to an inlet of a refrigerant pipe configured to receive refrigerant;
   measuring a second temperature of air that passes the evaporator, wherein measuring the second temperature comprises measuring a temperature of air at an upper portion of a duct that is configured to receive air, the evaporator being located in the duct;
   determining a temperature difference between the first temperature and the second temperature;
   comparing the temperature difference to a reference temperature;
   based on comparison results, adjusting an opening degree of the expansion valve, wherein adjusting the opening degree of the expansion valve comprises decreasing the opening degree of the expansion valve based on a determination that the temperature difference between the first temperature and the second temperature is less than the reference temperature; and
   based on an elapsed amount of time from a start of the dry cycle being greater or equal to a present time, performing an additional adjustment of the opening degree of the expansion valve after adjusting the opening degree of the expansion valve.

5. The control method of claim 4, wherein measuring the first temperature comprises measuring a temperature of refrigerant before heat exchange between refrigerant and air at the evaporator, and
   wherein measuring the second temperature comprises measuring a temperature of air before heat exchange between refrigerant and air at the evaporator.

6. The control method of claim 4, wherein performing the additional adjustment of the opening degree of the expansion valve comprises adjusting the opening degree of the expansion valve based on a preset time interval.

7. The control method of claim 4, wherein performing the additional adjustment of the opening degree of the expansion valve comprises decreasing the opening degree of the expansion valve based on the elapsed amount of time.

8. The control method of claim 4, wherein measuring the first temperature and the second temperature comprises continuing to measure the first temperature and the second temperature based on a determination that the temperature difference between the first temperature and the second temperature is greater than or equal to the reference temperature.

9. A control method for a laundry treating apparatus that is configured to perform a dry cycle for drying clothes, the laundry treating apparatus including an accommodating unit configured to accommodate clothes, a duct located outside of the accommodating unit and configured to define a circulation path of air to the accommodating unit, a fan located in the duct, an evaporator located in the duct and configured to vaporize refrigerant based on heat exchange between refrigerant and air that pass the evaporator, a refrigerant pipe coupled to the evaporator and configured to define a circulation path of refrigerant, a condenser coupled to the refrigerant pipe in the duct and configured to condense refrigerant based on heat exchange between refrigerant and air that have passed the evaporator, a compressor coupled to the refrigerant pipe and configured to compress refrigerant having passed the evaporator, and an expansion valve located between the condenser and the evaporator and configured to control opening and closing of the refrigerant pipe, the control method comprising:

measuring a first temperature of refrigerant at a position adjacent to an inlet of the refrigerant pipe, wherein measuring the first temperature comprises measuring a temperature of refrigerant at a position adjacent to an inlet of a refrigerant pipe configured to receive refrigerant;

measuring a second temperature of air at an upper portion of the duct, wherein measuring the second temperature comprises measuring a temperature of air at an upper portion of a duct that is configured to receive air, the evaporator being located in the duct;

determining a temperature difference between the first temperature and the second temperature;

comparing the temperature difference to a reference temperature;

based on comparison results, adjusting an opening degree of the expansion valve, wherein adjusting the opening degree of the expansion valve comprises decreasing the opening degree of the expansion valve based on a determination that the temperature difference between the first temperature and the second temperature is less than the reference temperature; and based on an elapsed amount of time from a start of the dry cycle being greater or equal to a present time, performing an additional adjustment of the opening degree of the expansion valve after adjusting the opening degree of the expansion valve.

10. The control method of claim 9, wherein performing the additional adjustment of the opening degree of the expansion valve comprises decreasing, based on a preset time interval, the opening degree of the expansion valve to increase a heat degree of the expansion valve.

11. The control method of claim 9, wherein performing the additional adjustment of the opening degree of the expansion valve comprises performing the additional adjustment of the opening degree of the expansion valve a plurality of times.

12. The control method of claim 9, wherein measuring the first temperature and the second temperature comprises continuing to measure the first temperature and the second temperature based on a determination that the temperature difference between the first temperature and the second temperature is greater than or equal to the reference temperature.

* * * * *